(12) United States Patent
Liu et al.

(10) Patent No.: US 10,712,974 B2
(45) Date of Patent: Jul. 14, 2020

(54) VIRTUAL DISK PROCESSING METHOD AND APPARATUS

(71) Applicant: Huawei Technologies Co., Ltd., Shenzhen (CN)

(72) Inventors: Jianqing Liu, Shenzhen (CN); Xingshui Dong, Shenzhen (CN); Lin Zhang, Panama (PA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 15/812,627

(22) Filed: Nov. 14, 2017

(65) Prior Publication Data

US 2018/0136881 A1 May 17, 2018

(30) Foreign Application Priority Data

Nov. 15, 2016 (CN) .......................... 2016 1 1013717

(51) Int. Cl.
| | | |
|---|---|---|
| *G06F 3/00* | (2006.01) | |
| *G06F 3/06* | (2006.01) | |
| *G06F 9/455* | (2018.01) | |
| *G06F 16/188* | (2019.01) | |
| *G06F 9/50* | (2006.01) | |
| *H04L 29/08* | (2006.01) | |

(52) U.S. Cl.
CPC .......... *G06F 3/0665* (2013.01); *G06F 3/0604* (2013.01); *G06F 3/067* (2013.01); *G06F 9/45558* (2013.01); *G06F 9/5022* (2013.01); *G06F 16/188* (2019.01); *H04L 67/1097* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | |
|---|---|---|
| 7,797,510 B1 | 9/2010 | Case et al. |
| 2012/0331242 A1 | 12/2012 | Shaikh et al. |
| 2015/0186259 A1 | 7/2015 | Thomas et al. |

FOREIGN PATENT DOCUMENTS

| | | |
|---|---|---|
| CN | 101986284 A | 3/2011 |
| CN | 105487984 A | 4/2016 |

OTHER PUBLICATIONS

Foreign Communication From a Counterpart Application, European Application No. 17200381.6, Extended European Search Report dated Mar. 13, 2018, 9 pages.

(Continued)

*Primary Examiner* — Midys Rojas
(74) *Attorney, Agent, or Firm* — Conley Rose, P.C.

(57) ABSTRACT

A virtual disk processing method and apparatus belong to the field of storage technologies, where the method includes receiving delete information from a client system of a first virtual machine, determining, according to the delete information, at least one data cluster in a first virtual disk corresponding to a designated file, where the first virtual disk is a virtual disk corresponding to the first virtual machine, setting the at least one data cluster to be available, determining, according to a storage mapping table, a target physical disk block corresponding to the at least one data cluster, where a correspondence between a data cluster in the first virtual disk and a physical disk block is recorded in the storage mapping table, and setting the target physical disk block to be available.

19 Claims, 10 Drawing Sheets

(56) References Cited

OTHER PUBLICATIONS

Machine Translation and Abstract of Chinese Publication No. CN101986284, Mar. 16, 2011, 17 pages.
Machine Translation and Abstract of Chinese Publication No. CN105487984, Apr. 13, 2016, 17 pages.
Foreign Communication From a Counterpart Application, Chinese Application No. 201611013717.5, Chinese Office Action dated Aug. 23, 2019, 10 pages.

VIRTUAL DISK PROCESSING METHOD AND APPARATUS

CROSS-REFERENCE TO RELATED APPLICATION

This application claims priority to Chinese Patent Application No. 201611013717.5 filed on Nov. 15, 2016, which is hereby incorporated by reference in its entirety.

TECHNICAL FIELD

This application relates to the field of storage technologies, and in particular, to a virtual disk processing method and apparatus.

BACKGROUND

In the field of storage technologies, virtualization technologies are widely used. Multiple virtual machines are usually created on one server, and each virtual machine may be used as an independent device to be managed and used. An operating system of the server is referred to as a host system, and an operating system of each virtual machine is referred to as a client system. After a virtual machine is created, the host system provides a virtual disk for a client system of the virtual machine such that the client system uses the virtual disk when running. From a perspective of the host system, the virtual disk is actually a file. Therefore, the virtual disk may also be referred to as a virtual disk file. When using the virtual disk, the client system may perform various operations such as adding, modifying, or deleting a file in the virtual disk. The client system interacts with the host system using a virtualization layer in the host system when performing an operation on the virtual disk. Similar to a compressed package, the virtual disk gradually expands as the virtual machine runs and is used. However, the virtual disk does not automatically lessen according to a deletion operation of the client system.

A conventional virtual disk lessening method is that after a virtual machine stops running, a user performs a compression operation on a virtual disk using a tool in order to lessen the virtual disk.

However, when the virtual disk is lessened using the conventional virtual disk lessening method, a service of the virtual machine is interrupted because the virtual machine stops running. In this way, data transmission and use on the virtual machine are affected, and consequently, work efficiency of the virtual machine is relatively low.

SUMMARY

This application provides a virtual disk processing method and apparatus to resolve the problem that work efficiency of a virtual machine is relatively low when a virtual disk is lessened using a conventional virtual disk lessening method. The technical solutions are as follows.

The virtual disk processing method provided in this application relates to a host that supports virtualization, and the host includes a processor and a storage. The processor includes one or more processing cores. By running a software program, the processor implements various function applications and processes data. The storage is connected to the processor using a bus. The storage is configured to store the software program, and the processor runs the software program such that a host system is formed on the host. At least one virtual machine runs on the host, and each of the at least one virtual machine corresponds to a client system. The storage includes a physical disk and memory. Optionally, the host may further include a network interface or another communications interface. The network interface is configured to perform network communication with another device. The network interface may be a network interface card.

The host system on the host may include at least one client system, and each client system includes a client virtual file system (VFS). The host system further includes a host VFS and a virtualization layer. Both the host VFS and the client VFS are VFSs. The VFS is an abstraction layer between a user application program and a physical file system, and is configured to process a system call in the physical file system. The VFS can provide a common interface for various file systems. Using the interface, the VFS can read different file systems from different physical media or can write different file systems into different physical media.

The host system provides, for the client system, a virtual disk required when the client system is running. A corresponding virtual disk is set for each client system included in the host system. From a perspective of the host system, the virtual disk may be a file in a host system. In actual application, the virtual disk includes multiple files. The client system may perform an operation on the multiple files included in the virtual disk, and this operation is implemented by means of cooperation between the host VFS in the host system and the client VFS in the client system. Further, when the client system performs an operation on a file, the client VFS in the client system generates corresponding operation information. The operation information may include information such as a file size, a file operation type, a file operation location, a data storage location, an Internet Protocol (IP) address of a client corresponding to the client system. In addition, the client VFS sends the operation information to a virtual bus system in the host system. After receiving the operation information, the virtual bus system in the host system forwards the operation information to the virtualization layer. The virtualization layer reads the operation information, searches, according to content included in the operation information, for the virtual disk corresponding to the client system, and after determining a target location of the file in the virtual disk, performs a corresponding operation on the file using the host VFS. The operation information may be write information, read information, delete information, or the like.

An operation of the host system is non-transparent for the client system, that is, the client system cannot learn the operation performed by the host system. Optionally, the virtualization layer running on the host system may be a hypervisor (also referred to as a virtual machine manager).

According to a first aspect, this application provides a virtual disk processing method, applied to a virtualization layer of a host that supports virtualization, where the host is the foregoing host that supports virtualization, at least one virtual machine runs on the host, the at least one virtual machine includes a first virtual machine, and the method includes receiving, by the virtualization layer, delete information sent by a client system of the first virtual machine, where the delete information is generated by the client system after a designated file is deleted from the first virtual machine, and the delete information includes an offset corresponding to the designated file and a size of the designated file, determining, according to the delete information, at least one data cluster in a first virtual disk corresponding to the designated file, where the first virtual disk is a virtual disk corresponding to the first virtual machine, setting the at least one data cluster to be available, determining, according to a storage mapping table, a target physical disk block corresponding to the at least one data cluster, where a correspondence between a data cluster in the first virtual disk and a physical disk block is recorded in the storage mapping table, and setting the target physical disk block to be available.

According to the solutions provided in this application, after delete information sent by a client system is received, a data cluster corresponding to a deleted designated file and a logical disk block corresponding to the corresponding data cluster may be determined according to the delete information, and both the corresponding data cluster and the logical disk block corresponding to the corresponding data cluster are set to be available. Therefore, a virtual disk automatically lessens according to a delete operation of the client system. Compared with a conventional virtual disk lessening method, according to the method, a virtual machine does not need to be stopped in a process in which the virtual disk automatically lessens. Therefore, a service of the virtual machine is not interrupted, and data transmission and use on the virtual machine are not affected, effectively improving work efficiency of the virtual machine.

Optionally, before receiving delete information sent by a client system of the first virtual machine, the method may further include dividing, by the virtualization layer, each virtual disk on the host into clusters such that each virtual disk is divided into at least one data cluster, allocating a data cluster identifier to each data cluster, dividing, by a host VFS, a physical disk on the host into blocks such that the physical disk is divided into at least one physical disk block, and allocating a number to each physical disk block.

It should be noted that both the cluster-based division operation performed on the virtual disk and the block-based division operation performed on the physical disk are initialization operations performed on the virtual disk and the physical disk for a subsequent processing process.

Optionally, before receiving delete information sent by a client system of the first virtual machine, the method further includes receiving, by the virtualization layer, write information sent by the client system, where the write information is generated by the client system after the designated file is written into the first virtual machine, and the write information includes the offset corresponding to the designated file and the size of the designated file, determining, according to the write information, the at least one data cluster in the first virtual disk corresponding to the designated file, obtaining a number of at least one physical disk block that is allocated to the first virtual disk and that is used to store the designated file (usually, the at least one physical disk block used to store the designated file is allocated by the host VFS, and the virtualization layer may obtain the number of the at least one physical disk block by interacting with the host VFS), storing, by the virtualization layer, the designated file in the at least one physical disk block, establishing a correspondence between the at least one data cluster and the at least one physical disk block, and recording the correspondence in the storage mapping table.

It should be noted that the correspondence between the at least one data cluster and the at least one physical disk block is dynamically established in a file write process. The correspondence is stored in the storage mapping table in order to search, in a subsequent delete process, for the physical disk block corresponding to the data cluster corresponding to the deleted designated file.

In a possible implementation, the storage mapping table is stored in a designated physical disk block corresponding to the first virtual disk, and the correspondence between a data cluster in the first virtual disk and a physical disk block is recorded in the storage mapping table, and determining, according to a storage mapping table, a target physical disk block corresponding to the at least one data cluster includes obtaining the storage mapping table from the designated physical disk block corresponding to the first virtual disk, and searching the storage mapping table to determine the target physical disk block corresponding to the at least one data cluster.

The storage mapping table is stored in the designated physical disk block corresponding to the first virtual disk, and when the target physical disk block corresponding to the at least one data cluster is to be determined, the corresponding target physical disk block is determined by searching the storage mapping table.

In another possible implementation, the storage mapping table is stored at a preset storage location in the physical disk, and a correspondence between a data cluster in each virtual disk on the host and a physical disk block is recorded in the storage mapping table, and determining, according to a storage mapping table, a target physical disk block corresponding to the at least one data cluster includes obtaining the storage mapping table from the preset storage location, and searching the storage mapping table to determine the target physical disk block corresponding to the at least one data cluster.

Correspondences between data clusters in virtual disks on the host and physical disk blocks are all stored at a same location in order to manage the correspondences together. In addition, when the target physical disk block corresponding to the at least one data cluster is to be determined, the corresponding physical disk block is determined by searching the storage mapping table Optionally, an index description is established for each virtual disk on the host, and the index description of each virtual disk is used to record an index number for uniquely identifying the virtual disk and a number of a physical disk block occupied by the virtual disk, after storing the designated file in the at least one physical disk block, the method further includes adding the number of the at least one physical disk block to an index description of the first virtual disk, where the number of the at least one physical disk block is added to the index description of the first virtual disk in order to search for the physical disk block in a processing process, and setting the target physical disk block to be available includes obtaining the index description of the first virtual disk, and deleting a number that is of the target physical disk block and that is recorded in the index description.

According to the solutions provided in this application, deleting a number that is of the target physical disk block and that is recorded in an index description is an implementation of setting a target physical disk block to be available.

Optionally, when a host is powered on, a virtualization layer compares, with an index number recorded in a host system, an index number obtained from an area that is set in a virtual disk and that is used to store an index number of the virtual disk in order to check whether a virtual disk corresponding to a virtual machine is abnormally changed. The abnormal change is not a change generated when the virtual machine is operated, but a change usually generated when the virtual disk is manually copied or replaced. The change is generated without virtualization layer participation.

According to the solutions provided in this application, a main objective of checking whether the virtual disk corresponding to the virtual machine is abnormally changed is to determine whether a correspondence that is between a data cluster in the virtual disk and a physical disk block and that is recorded in a storage mapping table is available in order to avoid a misoperation that occurs because the virtual disk is abnormally changed.

According to a second aspect, this application provides a virtual disk processing apparatus, applied to a virtualization layer of a host that supports virtualization, where at least one virtual machine runs on the host, the at least one virtual machine includes a first virtual machine, the virtual disk processing apparatus includes at least one module, and the at least one module is configured to implement the virtual disk processing method according to any one of the first aspect or the possible implementations of the first aspect.

The virtual disk processing apparatus provided in the second aspect may include a processor and a network interface.

The processor includes one or more processing cores. By running a software program and a module, the processor implements various function applications and processes data.

There may be multiple network interfaces, and the network interface is configured to communicate with another storage device or network device.

Optionally, the virtual disk processing apparatus further includes components such as a storage and a bus. The storage and the network interface are separately connected to the processor using the bus.

The storage may be configured to store the software program and the module. Further, the storage may store an operating system and an application program module required for at least one function. The operating system may be an operating system such as a Real Time eXecutive (RTX), LINUX, UNIX, WINDOWS, or OS X. The processor is configured to execute program code to implement related steps in the first aspect.

Optionally, the storage includes a physical disk.

Technical effects obtained in the second aspect of this application are similar to technical effects obtained in the first aspect using a corresponding technical means. Details are not described herein again.

Beneficial effects brought by the technical solutions provided in this application are as follows.

According to the virtual disk processing method and apparatus provided in this application, a correspondence between at least one data cluster and at least one physical disk block is established, and both a data cluster corresponding to a designated file deleted by a client system and a corresponding physical disk block are set to be available. Therefore, a virtual disk may automatically lessen according to a delete operation of the client system. Compared with a conventional virtual disk lessening method, according to the method, a virtual machine does not need to be stopped in a process in which the virtual disk automatically lessens. Therefore, a service of the virtual machine is not interrupted, and data transmission and use on the virtual machine are not affected, effectively improving work efficiency of the virtual machine.

Specific embodiments of this application are shown in the accompanying drawings, and the following gives more detailed description. These accompanying drawings and text descriptions are not intended to limit the conception scope of this application in any manner, but are intended to describe the concept of this application for a person skilled in the art with reference to particular embodiments.

DESCRIPTION OF EMBODIMENTS

To make the objectives, technical solutions, and advantages of the embodiments of the present disclosure clearer, the following further describes the embodiments of the present disclosure in detail with reference to the accompanying drawings. The described embodiments are merely some rather than all of the embodiments of the present disclosure.

Figure 1:
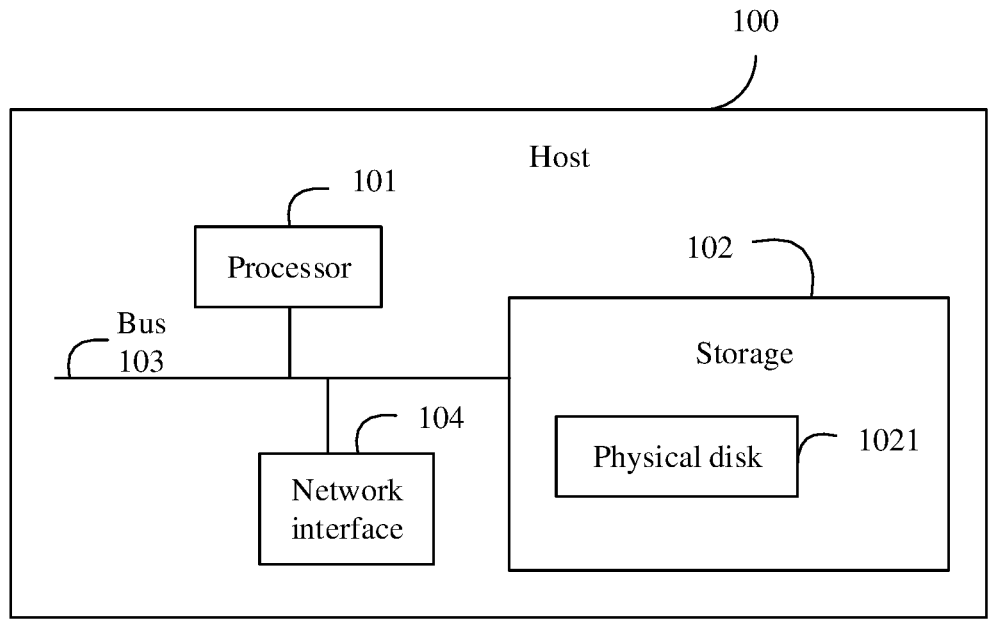
FIG. 1 is a schematic structural diagram of a host used in a virtual disk processing method according to an embodiment of the present disclosure.

As shown in FIG. 1, FIG. 1 is a schematic structural diagram of a host 100 used in a virtual disk processing method according to an embodiment of the present disclosure. The host 100 supports virtualization, and the host 100 may include a processor 101 and a storage 102. The processor 101 includes one or more processing cores. By running a software program, the processor 101 implements various function applications and processes data. The storage 102 may be connected to the processor 101 using a bus 103. The storage 102 may be configured to store the software program, and the processor 101 runs the software program such that a host system is formed on the host 100. At least one virtual machine runs on the host 100, and each of the at least one virtual machine corresponds to a client system. The storage 102 may include a physical disk 1021 and a memory (not shown in FIG. 1). Optionally, the host 100 may further include a network interface 104 or another communications interface. The network interface 104 is used to perform network communication with another device. The network interface 104 may be a network interface card.

Figure 2:
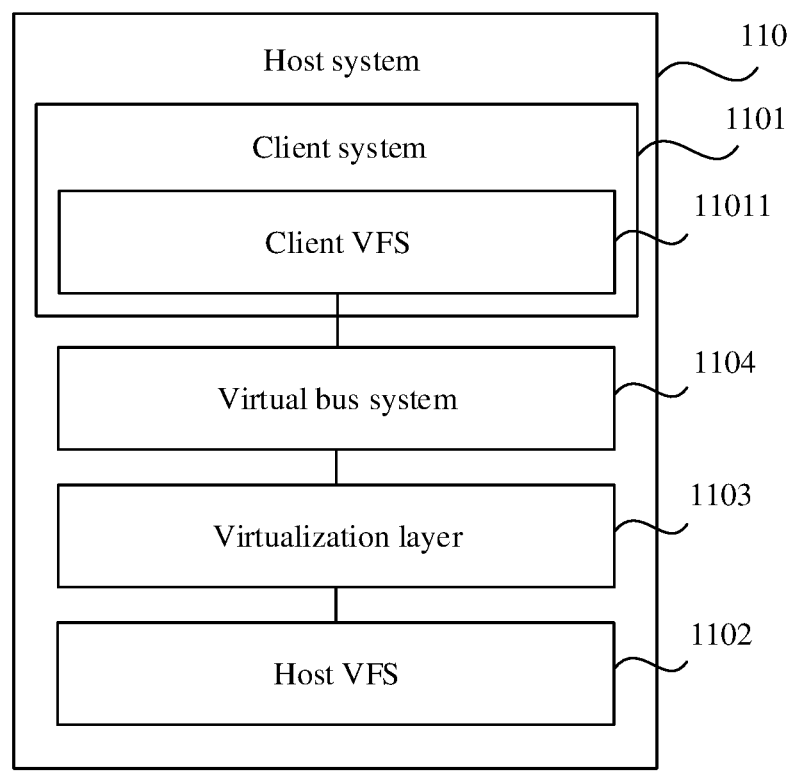
FIG. 2 is a schematic structural diagram of a host system used in a virtual disk processing method according to an embodiment of the present disclosure.

As shown in FIG. 2, FIG. 2 is a schematic structural diagram of a host system 110 on a host such as the host 100 shown in FIG. 1. The host system 110 may include at least one client system 1101, and each client system 1101 includes a client VFS 11011. The host system 110 further includes a host VFS 1102 and a virtualization layer 1103. Both the host VFS 1102 and the client VFS 11011 are VFSs. The VFS is an abstraction layer between a user application program and a physical file system, and is configured to process a system call in the physical file system. The VFS can provide a common interface for various file systems. Using the interface, the VFS can read different file systems from different physical media or can write different file systems into different physical media. In FIG. 2, an example in which the host system 110 includes one client system 1101 is used for description. In actual application, the host system 110 may include multiple client systems 1101. For a structure of each client system 1101, refer to FIG. 2.

The host system 110 provides, for the client system 1101, a virtual disk required when the client system 1101 is running. A corresponding virtual disk is set for each client system 1101 included in the host system 110. From a perspective of the host system 110, the virtual disk may be a file in a host system 110. In actual application, the virtual disk includes multiple files. The client system 1101 may perform an operation on the multiple files included in the virtual disk, and this operation needs to be implemented by means of cooperation between the host VFS 1102 in the host system 110 and the client VFS 11011 in the client system 1101. Further, when the client system 1101 performs an operation on a file, the client VFS 11011 in the client system 1101 generates corresponding operation information. The operation information may include information such as a file size, a file operation type, a file operation location, a data storage location, an IP address of a client corresponding to the client system 1101. In addition, the client VFS 11011 sends the operation information to a virtual bus system 1104 in the host system 110. After receiving the operation information, the virtual bus system 1104 in the host system 110 forwards the operation information to the virtualization layer 1103. The virtualization layer 1103 reads the operation information, searches, according to content included in the operation information, for the virtual disk corresponding to the client system 1101, and performs a corresponding operation on the file using the host VFS 1102 after determining a target location of the file in the virtual disk. The operation information may be write information, read information, delete information, or the like.

An operation of the host system 110 is non-transparent for the client system 1101, that is, the client system 1101 cannot learn the operation performed by the host system 110. Optionally, the virtualization layer 1103 running on the host system 110 may be a hypervisor (also referred to as a virtual machine manager).

Figure 3A:
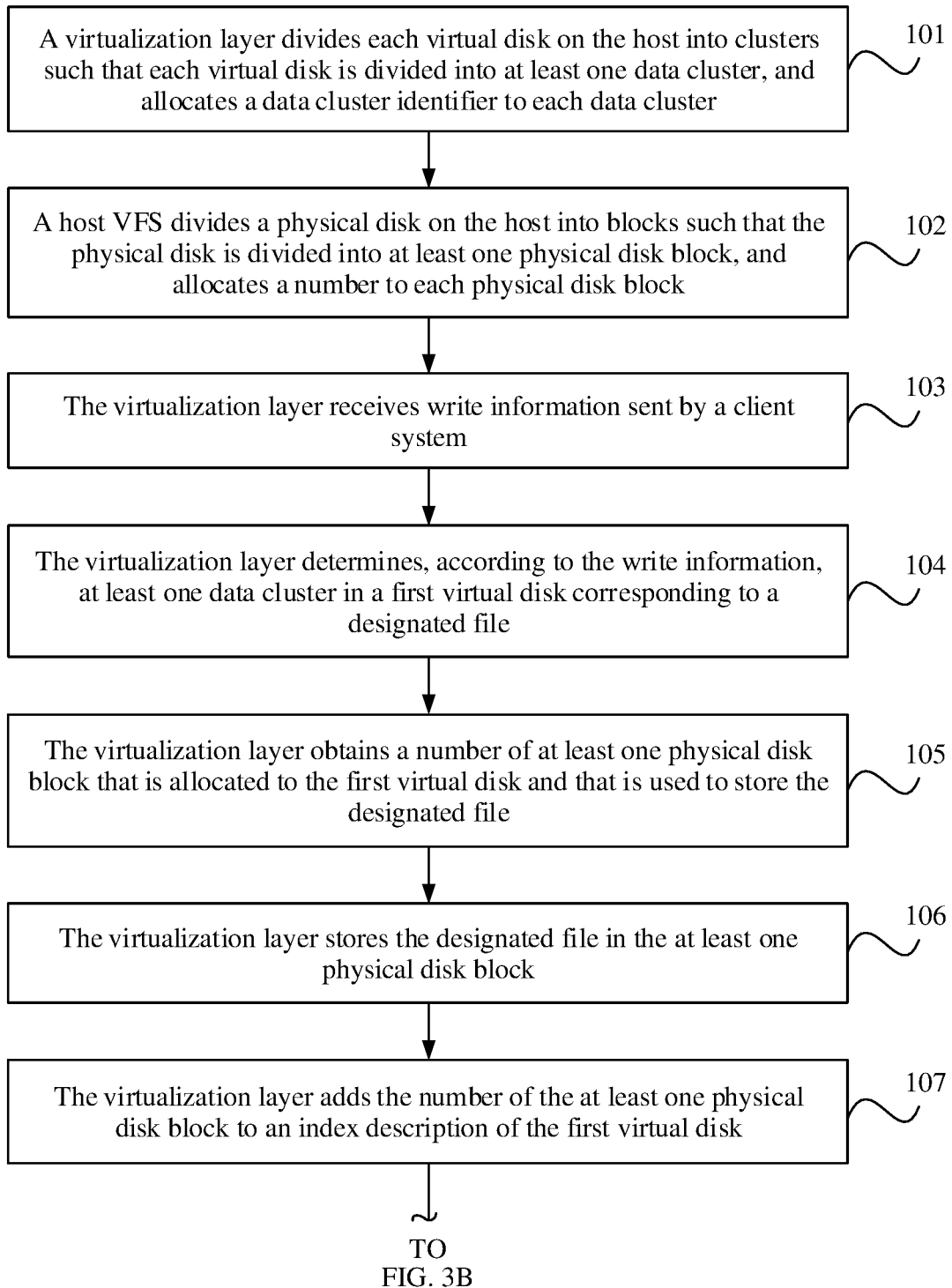
FIG. 3A and FIG. 3B are a schematic flowchart of a virtual disk processing method according to an embodiment of the present disclosure.
Figure 3B:
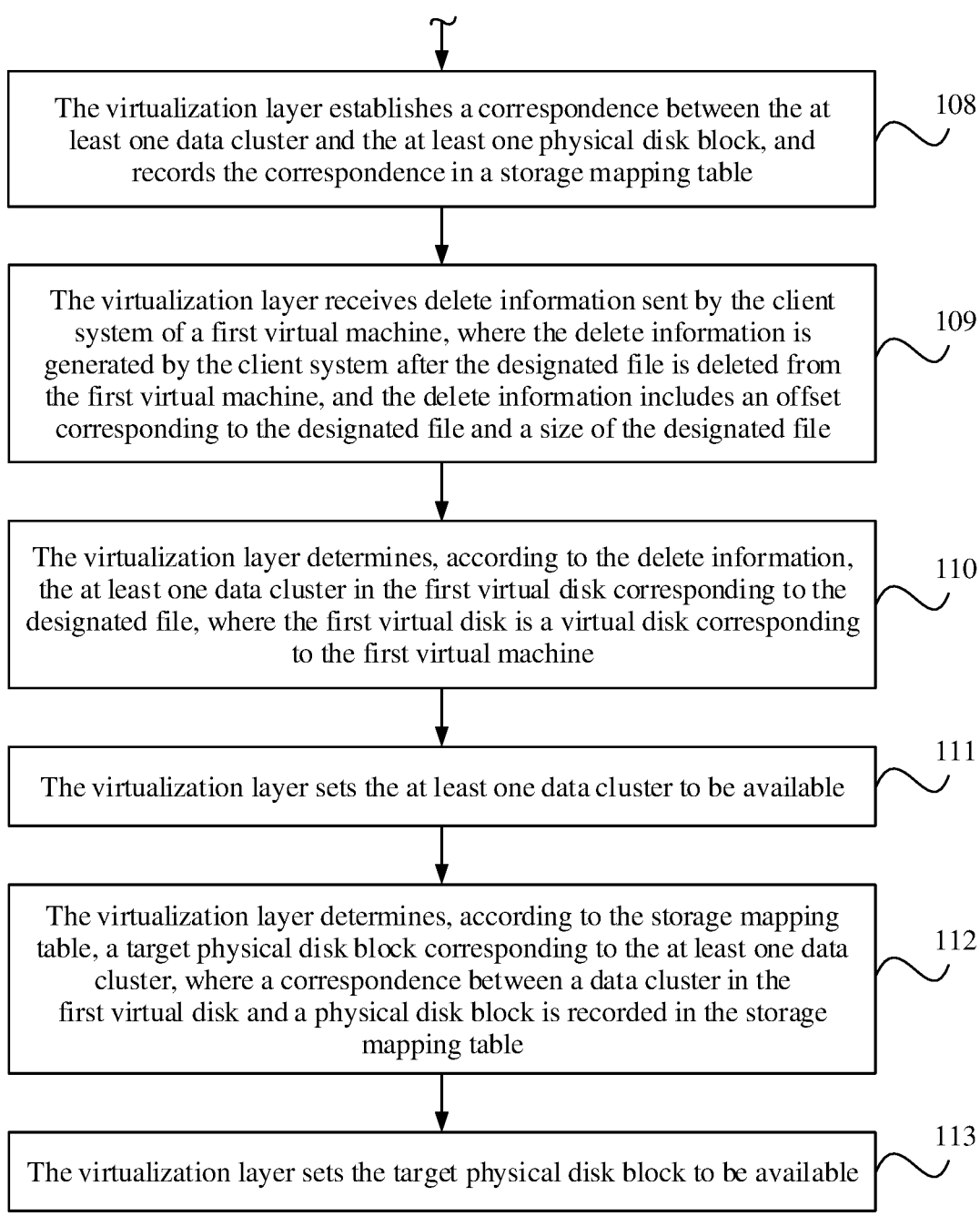

FIG. 3A and FIG. 3B are a schematic flowchart of a virtual disk processing method according to an embodiment of the present disclosure. At least one virtual machine runs on a host. It is assumed that the at least one virtual machine includes a first virtual machine, and the first virtual machine is any virtual machine of the at least one virtual machine. As shown in FIG. 3A and FIG. 3B, the method may include the following steps.

Step 101: A virtualization layer divides each virtual disk on the host into clusters such that each virtual disk is divided into at least one data cluster, and allocates a data cluster identifier to each data cluster.

When each virtual machine is generated on the host, the virtualization layer performs a cluster-based division operation on a virtual disk corresponding to each virtual machine. Each virtual disk is divided into at least one equal-sized data cluster after the cluster-based division operation. For example, each data cluster has a size of 16 kilobytes (KB). When the virtual disk is divided into clusters, a corresponding data cluster identifier is allocated to each data cluster. The data cluster identifier can be used in the host system to uniquely identify the data cluster corresponding to the data cluster identifier. That is, using the data cluster identifier, the data cluster corresponding to the data cluster identifier can be uniquely found from multiple data clusters included in the virtual disk.

All data used when a client system is running is stored in a data cluster corresponding to a virtual disk of the client system, and different data required when the client system is running is stored in different data clusters. That is, all files in the client system are stored in data clusters corresponding to the virtual disk of the client system. In addition, all file operations performed by the client system are implemented using the virtualization layer. The file operations completed using the virtualization layer are essentially operations performed on the data cluster in the virtual disk. That is, the virtualization layer searches the virtual disk of the client system according to operation information received from a virtual bus system, and after finding a data cluster on which a write operation needs to be performed, performs a corresponding operation on the data cluster.

Step 102: A host VFS divides a physical disk on the host into blocks such that the physical disk is divided into at least one physical disk block, and allocates a number to each physical disk block.

When the host VFS in the host system manages the physical disk, the host VFS performs a block-based division operation on the physical disk on the host. After the block-based division operation, the physical disk is divided into many equal-sized physical disk blocks, also referred to as logical blocks. For example, each physical disk block may have a size of 4 KB. When the physical disk is divided into blocks, the number is further allocated to each physical disk block. For example, the physical disk blocks may be numbered from 0. In addition, the physical disk blocks may be grouped into multiple physical disk block groups, and each physical disk block group includes a different quantity of physical disk blocks. Each physical disk block group includes multiple areas with different functions. The multiple areas may include areas such as a superblock, a group descriptor, a block bitmap, an index description (such as inode) bitmap, an index description table (such as inode table), and a data block. The superblock is used to store related information of a file system, for example, a block count, an inode count, a supported characteristic, and maintenance information. The group descriptor is used to describe related information of a physical disk block group, for example, to record locations of the block bitmap, the index description bitmap, and the index description table. The block bitmap is used to track a usage status of a data block in the physical disk block group. The index description bitmap is used to record a currently used entry in the index description table. The index description table is used to store metadata related to a file, for example, a timestamp, a physical disk block map, or an extended attribute. The data block is used to store a file.

In actual application, when each virtual machine is generated on the host, the host VFS needs to establish, for a corresponding virtual disk, an index description, which is also referred to as an index node, and records the index description in an index description table. The index description table is stored at a preset location in the physical disk. An index description of each virtual disk is used to record an index number for uniquely identifying the virtual disk and a number of a physical disk block occupied by the virtual disk. The index number of the virtual disk is a unique identifier of each virtual disk in the host system.

Figure 4:
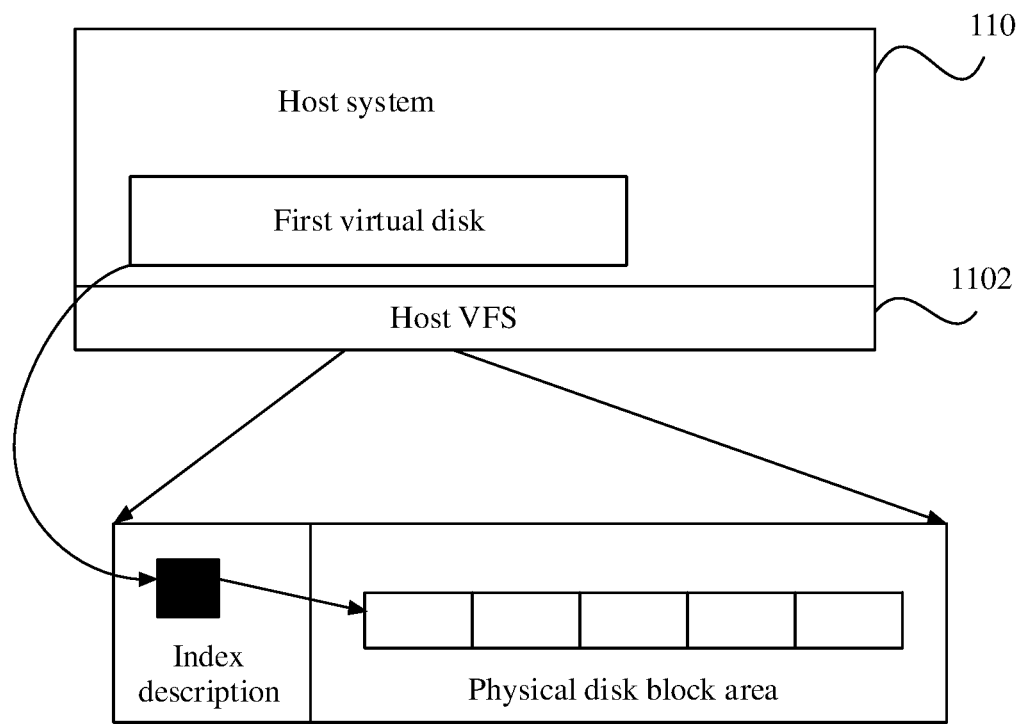
FIG. 4 is a schematic diagram of a relationship among a virtual disk file, an index description, and a physical disk block according to an embodiment of the present disclosure.

Optionally, a relationship among a virtual disk file, an index description, and a physical disk block may be shown in FIG. 4. It is assumed that a first virtual disk is set in a host system 110, and a host VFS 1102 establishes an index description for the first virtual disk. When a file is written into the first virtual disk, the host VFS 1102 allocates at least one corresponding physical disk block (for example, the at least one physical disk block is in a physical disk block area in FIG. 4) to the file, and records a number of the allocated physical disk block in the index description. Both the index description and the physical disk block area are in the host VFS 1102. A number of a physical disk block occupied by the first virtual disk is recorded in the index description. Therefore, after receiving subsequent operation information, a virtualization layer may search the index description to find, from the physical disk block area according to the index description, the physical disk block occupied by the first virtual disk, and may perform a corresponding operation.

Optionally, the index description of each virtual disk may be stored at a preset location in the physical disk, and the preset location may be a file header of the physical disk. The file header of the physical disk is space with a preset size that is allocated at a start location in the physical disk. A size of storage space occupied by the index description of each virtual disk is not limited in this embodiment of the present disclosure. For example, the index description may be stored in the file header of the physical disk in the following manner. Assuming that the file header of the physical disk has a size of 32 bytes, other related information of the physical disk is stored in the first 16 bytes, and the index description corresponding to the physical disk occupies memory with a size of 4 bytes, the index description of the physical disk may be stored starting from the $17^{th}$ byte of the physical disk, and a storage location of the index description is the $17^{th}$ byte to the $20^{th}$ byte of the file header.

Step 103: The virtualization layer receives write information sent by a client system.

The write information is generated by the client system after a designated file is written into the first virtual machine, and the write information includes an offset corresponding to the designated file and a size of the designated file.

After the designated file is written into the first virtual machine, a client VFS generates the corresponding write information, and sends the write information to the virtual bus system. The virtual bus system receives and reads the write information, and forwards the write information to the virtualization layer. After reading the write information, the virtualization layer correspondingly searches, according to the information content included in the write information, data clusters that are prestored in the host system and that are corresponding to multiple virtual disks such that the virtualization layer can find a data cluster that corresponds to the designated file and on which the client system needs to perform a write operation.

Figure 5:
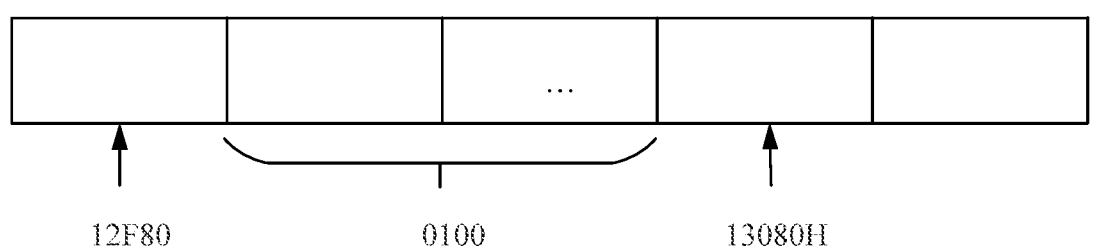
FIG. 5 is a schematic diagram of determining, according to write information, a storage location of the first data cluster of at least one data cluster corresponding to a designated file according to an embodiment of the present disclosure.

Optionally, the write information includes the offset corresponding to the designated file and the size of the designated file. At least one data cluster in the first virtual disk corresponding to the designated file may be determined according to the write information. The offset corresponding to the designated file is used to determine a storage location of the first data cluster of the at least one data cluster. Further, the offset and an initial storage location in the first virtual disk are added to obtain the storage location of the first data cluster. The size of the designated file is used to determine a storage location of the last data cluster of the at least one data cluster. Further, the size of the designated file and the storage location of the first data cluster of the at least one data cluster corresponding to the designated file are added to obtain the storage location of the last data cluster of the at least one data cluster. For example, as shown in FIG. 5, assuming that the initial storage location in the first virtual disk is 12F80, and the offset corresponding to the designated file is 0100, the storage location of the first data cluster of the at least one data cluster is calculated according to a formula 12F80+0010=13080H. For a method for determining the storage location of the last data cluster of the at least one data cluster according to the size of the designated file, refer to the foregoing process. Details are not described herein again.

It should be noted that the initial storage location in the first virtual disk is a location, in the first virtual disk, of the first data cluster of multiple sequentially arranged data clusters that are obtained after a cluster-based division operation is performed on the first virtual disk.

Optionally, an area used to store an index number of each virtual disk may be set in the virtual disk. The area may be a designated physical disk block such as a file header. In a process of writing the designated file, the virtualization layer may obtain an index number of a corresponding virtual disk, and store the index number in an area that is set in the virtual disk and that is used to store the index number of the virtual disk.

Step 104: The virtualization layer determines, according to the write information, at least one data cluster in a first virtual disk corresponding to a designated file.

Figure 6:
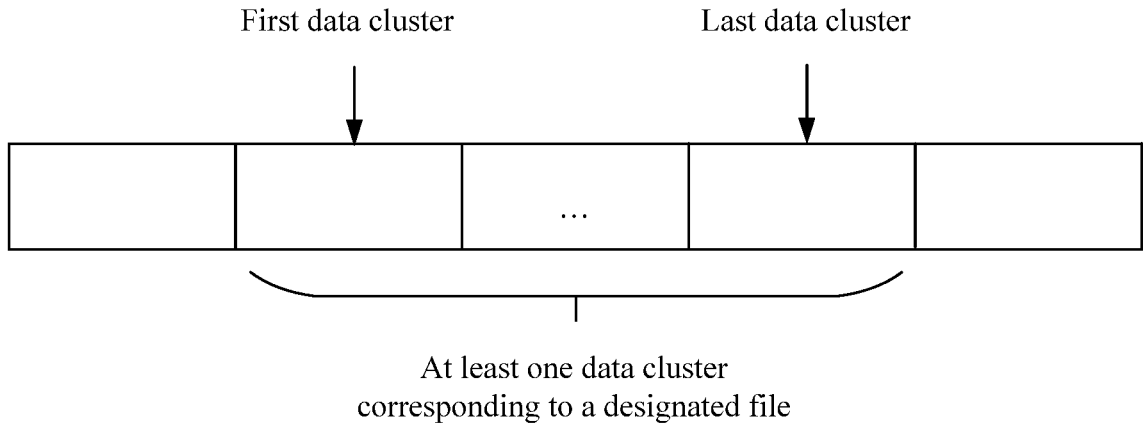
FIG. 6 is a schematic diagram of determining, according to write information, at least one data cluster corresponding to a designated file according to an embodiment of the present disclosure.

After the first virtual disk is divided into clusters, the first virtual disk is divided into at least one equal-sized data cluster. Therefore, for the first virtual disk, a location of each data cluster in the virtual disk is fixed and known. In addition, in step 103, a write location, in the virtual disk, of the at least one data cluster occupied by the designated file is uniquely determined according to the write information. Therefore, the at least one data cluster corresponding to the designated file may be determined in the first virtual disk according to cluster-based division information of the virtual disk and the write information of the designated file. That is, the first data cluster of the at least one data cluster corresponding to the designated file may be determined according to the offset, the last data cluster of the at least one data cluster corresponding to the designated file may be determined according to the size of the designated file and the first data cluster of the at least one data cluster corresponding to the designated file, and data clusters from the first data cluster to the last data cluster are the at least one data cluster in the first virtual disk corresponding to the designated file. As shown in FIG. 6, all the data clusters from the first data cluster to the last data cluster are the at least one data cluster in the first virtual disk corresponding to the designated file, where the at least one data cluster is determined according to the write information.

For example, assuming that the designated file written into the first virtual disk is a file 1, it is determined, according to write information of the file 1, that the file 1 occupies three data clusters, and data cluster identifiers of the data clusters corresponding to the file 1 are a cluster 1 to a cluster 3, a correspondence between the file 1 and the data cluster identifiers may be shown in Table 1.

TABLE 1

| File number | Data cluster identifier |
|---|---|
| 1 | Cluster 1 |
|  | Cluster 2 |
|  | Cluster 3 |

In actual application, because a storage location of the designated file in the virtual disk may be clearly determined according to the offset corresponding to the designated file and the size of the designated file that are in the write information, the write information may not carry a file number. The virtualization layer may clearly determine that the cluster 1 to the cluster 3 belong to a same file. The virtualization layer may allocate, to the cluster 1 to the cluster 3, one identifier that is used to indicate that the cluster 1 to the cluster 3 belong to the same file, or may record numbers of the cluster 1 to the cluster 3 in a same table entry to indicate that the cluster 1 to the cluster 3 belong to the same file. Correspondingly, the list entry on the left of Table 1 that is used to record a file number may not exist.

Step 105: The virtualization layer obtains a number of at least one physical disk block that is allocated to the first virtual disk and that is used to store the designated file.

The virtual disk is essentially stored in the physical disk in the host system, and when being managed by the host VFS, the physical disk is divided into many equal-sized physical disk blocks. Therefore, the designated file written into the first virtual machine is inevitably stored in the at least one physical disk block in the host system. The at least one physical disk block used to store the designated file may be allocated to the first virtual disk according to the size of the designated file and storage information of the physical disk. In addition, in this process, the virtualization layer may obtain the number of the at least one physical disk block that is allocated by the host VFS to the first virtual disk and that is used to store the designated file. For example, assuming that the designated file has a size of 5 megabytes (MB), each physical disk block has a size of 1 MB, and physical disk blocks in the host system whose numbers are 202 to 210 are available for storage, the host VFS may allocate, to the first virtual disk, physical disk blocks whose numbers are 202 to 206 in order to store the designated file. Therefore, the number that is of the at least one physical disk block and that is obtained by the virtualization layer is 202 to 206, where the at least one physical disk block is allocated to the first virtual disk and used to store the designated file.

Step 106: The virtualization layer stores the designated file in the at least one physical disk block.

After the host VFS allocates, to the first virtual disk, the at least one physical disk block used to store the designated file, the virtualization layer may store the designated file in the allocated at least one physical disk block.

For example, an assumption the same as that in step 104 is made. It is assumed that the designated file in the first virtual disk is a file 1, the write information carries a file number 1 of the designated file, and the file 1 occupies three data clusters. It is assumed that a size of one data cluster is equal to a size of four physical disk blocks, the file 1 is stored in 12 (that is, 3*4) physical disk blocks, and a correspondence between the designated file in the first virtual disk and a number of a physical disk block may be shown in Table 2.

TABLE 2

| File number | Number of a physical disk block |
|---|---|
| 1 | Block 1 to block 12 |

In actual application, because a storage location of the designated file in the physical disk may be clearly determined, the write information may not carry a file number. The virtualization layer may clearly determine that a block 1 to a block 12 belong to a same file. The virtualization layer may allocate, to the block 1 to the block 12, one identifier that is used to indicate that the block 1 to the block 12 belong to the same file, or may record numbers of the block 1 to the block 12 in a same table entry to indicate that the block 1 to the block 12 belong to the same file. Correspondingly, there may be no list entry on the left of Table 2 that is used to record a file number.

Step 107: The virtualization layer adds the number of the at least one physical disk block to an index description of the first virtual disk.

After the designated file is stored in the at least one physical disk block, the number of the at least one physical disk block may be added to the index description of the first virtual disk in order to search for an actual physical storage location of the written designated file.

Step 108: The virtualization layer establishes a correspondence between the at least one data cluster and the at least one physical disk block, and records the correspondence in a storage mapping table.

As described above, in actual application, when each virtual machine is generated, an index description is established for each virtual disk corresponding to each virtual machine. In a process of writing the designated file, the at least one data cluster in the first virtual disk and corresponding to the designated file is determined according to the write information, that is, the virtualization layer obtains a data cluster identifier of the at least one data cluster corresponding to the designated file. In addition, in the write process, the virtualization layer obtains the number of the at least one physical disk block that is allocated to the first virtual disk and that is used to store the designated file. Therefore, in the process of writing the designated file, the virtualization layer may dynamically generate a correspondence between a data cluster identifier and a number of a physical disk block, that is, establish the correspondence between the at least one data cluster and the at least one physical disk block. Optionally, a file identifier of the designated file written when the correspondence is established is further recorded in the correspondence.

For example, referring to Table 1 and Table 2, a same assumption is made. It is assumed that the designated file written into the first virtual disk is a file 1, the file 1 includes three data clusters, data cluster identifiers of the data clusters corresponding to the file 1 are a cluster 1 to a cluster 3, the file 1 is stored in 12 physical disk blocks, and numbers of the 12 physical disk blocks are a block 1 to a block 12. Because a physical disk block is a minimum unit for storing data in a physical disk, for example, 512 bytes, each data cluster may be stored in multiple physical disk blocks. The correspondence between the at least one data cluster and the at least one physical disk block may be established according to the at least one data cluster and the at least one physical disk block that are obtained by the virtualization layer in the process of writing the designated file. The correspondence may be shown in Table 3. Further, a correspondence between the 12 physical disk blocks and the three data clusters corresponding to the file 1 is as follows. The three data clusters whose data cluster identifiers are the cluster 1 to the cluster 3 are corresponding to the 12 physical disk blocks whose numbers are the block 1 to the block 12.

TABLE 3

| File number | Data cluster identifier | Number of a physical disk block |
|---|---|---|
| 1 | Cluster 1 | Block 1 |
|   | Cluster 2 | Block 2 |
|   | Cluster 3 | Block 3 |
|   |   | Block 4 |
|   |   | Block 5 |
|   |   | Block 6 |
|   |   | Block 7 |
|   |   | Block 8 |
|   |   | Block 9 |
|   |   | Block 10 |
|   |   | Block 11 |
|   |   | Block 12 |

When each virtual disk on the host is divided into clusters, each virtual disk is divided into at least one equal-sized data cluster. In addition, after the physical disk on the host is divided into blocks, the physical disk is divided into many equal-sized physical disk blocks. Therefore, the correspondence between the at least one data cluster and the at least one physical disk block may further be shown in Table 4. Further, the correspondence between the 12 physical disk blocks and the three data clusters corresponding to the file 1 is as follows. A data cluster whose data cluster identifier is a cluster 1 corresponds to four physical disk blocks whose numbers are a block 1 to a block 4, a data cluster whose data cluster identifier is a cluster 2 corresponds to four physical disk blocks whose numbers are a block 5 to a block 8, and a data cluster whose data cluster identifier is a cluster 3 corresponds to four physical disk blocks whose numbers are a block 9 to a block 12.

TABLE 4

| File number | Data cluster identifier | Number of a physical disk block |
|---|---|---|
| 1 | Cluster 1 | Block 1 |
|   |   | Block 2 |
|   |   | Block 3 |
|   |   | Block 4 |
|   | Cluster 2 | Block 5 |
|   |   | Block 6 |
|   |   | Block 7 |
|   |   | Block 8 |
|   | Cluster 3 | Block 9 |
|   |   | Block 10 |
|   |   | Block 11 |
|   |   | Block 12 |

After the correspondence between the at least one data cluster and the at least one physical disk block is established, the correspondence may be recorded in the storage mapping table for subsequent use. The storage mapping table may be stored in a designated physical disk block corresponding to the first virtual disk, or may be stored at a preset storage location in the physical disk on the host. This is not limited in this embodiment of the present disclosure. In addition, a storage location of the storage mapping table may be the file header of the physical disk, or may be a file trailer. This is not limited in this embodiment of the present disclosure either. After the storage mapping table is stored in the designated physical disk block corresponding to the first virtual disk, a correspondence between a data cluster in the first virtual disk and a physical disk block is recorded in the storage mapping table. A correspondence between a data cluster in each virtual disk on the host and a physical disk block is recorded in the storage mapping table when the storage mapping table is stored at the preset storage location in the physical disk corresponding to the host.

In step 108, a process of establishing the correspondence between the at least one data cluster and the at least one physical disk block that are of the designated file is described using the designated file as an example. Actually, in the host system, for a process of establishing a correspondence between a data cluster and a physical disk block that are of any file, refer to step 108. There are multiple entries in the storage mapping table. For a format of each table entry, refer to a format of the table entry in Table 3 or Table 4. For example, assuming that a format of each table entry in Table 5 is the same as a format of each table entry in Table 4, the storage mapping table may be shown in FIG. 5, and correspondences between data clusters of two files and physical disk blocks of the two files are stored in the storage mapping table. In actual application, correspondences between data clusters of multiple files and physical disk blocks of the multiple files are stored in the storage mapping table, and Table 5 is merely used as an example for description.

TABLE 5

| File number | Data cluster identifier | Number of a physical disk block |
|---|---|---|
| 1 | Cluster 1 | Block 1 |
|   |   | Block 2 |
|   |   | Block 3 |
|   |   | Block 4 |
|   | Cluster 2 | Block 5 |
|   |   | Block 6 |
|   |   | Block 7 |
|   |   | Block 8 |
|   | Cluster 3 | Block 9 |
|   |   | Block 10 |
|   |   | Block 11 |
|   |   | Block 12 |
| 2 | Cluster 4 | Block 13 |
|   |   | Block 14 |
|   |   | Block 15 |
|   |   | Block 16 |
|   | Cluster 5 | Block 17 |
|   |   | Block 18 |
|   |   | Block 19 |
|   |   | Block 20 |

In actual application, the virtualization layer may learn data clusters that belong to a same file and physical disk blocks that belong to the same file. Therefore, after a correspondence between the data cluster and the physical disk block is established, a corresponding file number may not be recorded in a corresponding table. Therefore, the list entries on the most left of Table 3 to Table 5 that are used to record file numbers may not exist.

Step 109: The virtualization layer receives delete information sent by the client system of a first virtual machine, where the delete information is generated by the client system after the designated file is deleted from the first virtual machine, and the delete information includes an offset corresponding to the designated file and a size of the designated file.

Optionally, the deleted designated file is a file that is generated when a virtual machine is running, and when being no longer required, the file is deleted but is still in the virtual disk.

When the client system performs a delete operation on the virtual machine, the client VFS generates corresponding delete information, and sends the corresponding delete information to the virtual bus system in the host system. The virtual bus system receives and reads the delete information, and forwards the delete information to the virtualization layer. Optionally, the delete information includes the offset corresponding to the designated file and the size of the designated file. For related descriptions of the offset corresponding to the designated file and the size of the designated file, refer to the corresponding descriptions in step 103. Details are not described herein again.

Step 110: The virtualization layer determines, according to the delete information, the at least one data cluster in the first virtual disk corresponding to the designated file, where the first virtual disk is a virtual disk corresponding to the first virtual machine.

After reading the delete information, the virtualization layer may correspondingly search, according to the information content included in the delete information, multiple data clusters that are prestored in the host system and that are corresponding to the first virtual disk such that the virtualization layer can find the at least one data cluster corresponding to the designated file and on which the client system needs to perform a delete operation.

For a method for determining, according to the delete information, the at least one data cluster in the first virtual disk corresponding to the designated file, correspondingly refer to the method for determining, according to the write information, the at least one data cluster in the first virtual disk corresponding to the designated file in step 104. Details are not described herein.

Step 111: The virtualization layer sets the at least one data cluster to be available.

Optionally, an implementation of setting the at least one data cluster to be available is changing a status identifier of the data cluster. Further, it may be assumed that, when the status identifier of the data cluster is 1, the data cluster is in an available state, and when the status identifier of the data cluster is 0, the data cluster is in an unavailable state. Therefore, if the at least one data cluster corresponding to the designated file needs to be set to be available, the status identifier of the target data cluster is changed from 0 into 1.

It should be noted that in this embodiment of the present disclosure, an implementation method for setting the data cluster to be available is merely used as an example for description. In actual application, the data cluster may be set to be available in another manner. This is not limited in this embodiment of the present disclosure.

Step 112: The virtualization layer determines, according to the storage mapping table, a target physical disk block corresponding to the at least one data cluster, where a correspondence between a data cluster in the first virtual disk and a physical disk block is recorded in the storage mapping table.

As described in step 108, the storage mapping table may be stored in the designated physical disk block corresponding to the first virtual disk, or may be stored at the preset storage location in the physical disk. According to different storage locations of the storage mapping table, for determining the target physical disk block corresponding to the at least one data cluster according to the storage mapping table, there may be at least the following two implementations.

The correspondence between a data cluster in the first virtual disk and a physical disk block is recorded in the storage mapping table when the storage mapping table is stored in the designated physical disk block corresponding to the first virtual disk. Therefore, a first implementation of determining, according to the storage mapping table, the target physical disk block corresponding to the at least one data cluster includes the following steps.

Step a1: Obtain the storage mapping table from a designated physical disk block of the first virtual disk.

After receiving the delete information, the virtualization layer may search, according to the delete information, the designated physical disk block of the first virtual disk for the storage mapping table in which the correspondence between a data cluster in the first virtual disk and a physical disk block is recorded.

Step b1: Search the storage mapping table to determine the target physical disk block corresponding to the at least one data cluster.

The storage mapping table obtained in step a1 is searched according to the at least one data cluster determined in step 110 corresponding to the designated file such that the target physical disk block corresponding to the at least one data cluster can be determined.

For example, assuming that a partial correspondence in the storage mapping table may be shown in Table 3, and the at least one data cluster identifier determined in step 110 is a cluster 1 to a cluster 3, it may be learned, according to the storage mapping table, that the at least one data cluster corresponds to 12 physical disk blocks whose numbers are a block 1 to a block 12.

The correspondence between a data cluster in each virtual disk on the host and a physical disk block is recorded in the storage mapping table when the storage mapping table is stored at the preset storage location in the physical disk. Therefore, a second implementation of determining, according to the storage mapping table, the target physical disk block corresponding to the at least one data cluster includes the following steps.

Step a2: Obtain the storage mapping table from a preset storage location.

When needing to determine, according to the storage mapping table, the target physical disk block corresponding to the at least one data cluster, the virtualization layer obtains the storage mapping table from the preset storage location in the physical disk for use.

Step b2: Search the storage mapping table to determine the target physical disk block corresponding to the at least one data cluster.

The correspondence between a data cluster in each virtual disk on the host and a physical disk block is recorded in the storage mapping table that is stored at the preset storage location in the physical disk. Therefore, when the target physical disk block corresponding to the at least one data cluster is determined, the storage mapping table needs to be searched according to the data cluster identifier of the at least one data cluster, and the target physical disk block corresponding to the at least one data cluster is determined according to the established correspondence between the at least one data cluster and the at least one physical disk block.

For example, referring to the correspondence in Table 3, assuming that the data cluster identifier of the at least one data cluster of the designated file is a cluster 1 to a cluster 3, it may be learned, by searching Table 3 according to the data cluster identifier, that data clusters whose data cluster identifiers are the cluster 1 to the cluster 3 are corresponding to target physical disk blocks whose numbers are a block 1 to a block 12.

Optionally, when the target physical disk block corresponding to the at least one data cluster is determined, the storage mapping table may be searched according to a data cluster identifier of a data cluster of the at least one data cluster, and the target physical disk block corresponding to the at least one data cluster is determined according to the established correspondence between the at least one data cluster and the at least one physical disk block. For example, also referring to Table 3, assuming that a data cluster identifier of a data cluster of the at least one data cluster is a cluster 3, it may be learned from Table 3 that the data cluster whose data cluster identifier is the cluster 3 corresponds to a designated file 1. Correspondingly, it may be learned that a data cluster identifier of at least one data cluster corresponding to the designated file 1 is a cluster 1 to a cluster 3, and it may be found, from the table according to the data cluster identifier, that a number of a target physical disk block corresponding to the at least one data cluster is a block 1 to a block 12.

Step 113: The virtualization layer sets the target physical disk block to be available.

In step 111, that the data cluster is set to be available merely indicates that the corresponding data cluster is in an available state. However, the physical disk block in the physical disk corresponding to the data cluster is still in an occupied state. That the physical disk block is in an occupied state indicates that a write operation cannot be performed on the physical disk block, and disk space corresponding to the physical disk block is still in a used state. That is, an objective of deletion cannot be achieved by setting only the data cluster to be available. Therefore, after the data cluster is set to be available, the corresponding physical disk block further needs to be set to be available. After the physical disk block corresponding to the data cluster is set to be available, the corresponding physical disk block may be used again, and the disk space corresponding to the physical disk block is released. In this way, disk space occupied by the virtual disk automatically lessens. Therefore, disk space available to the system correspondingly expands.

Optionally, that the target physical disk block is set to be available may include the following steps.

Step a3: Obtain the index description of the first virtual disk.

The target physical disk block corresponding to the at least one data cluster is determined according to the storage mapping table in step 112, and the index description of the first virtual disk may be obtained according to the determined target physical disk block.

Step b3: Delete a number that is of the target physical disk block and that is recorded in the index description.

The number that is of the target physical disk block and that is recorded in the index description indicates that the corresponding physical disk block is in an occupied state. That the physical disk block is in an occupied state indicates that the physical disk block is in an unavailable state, that is, a write operation cannot be performed on the physical disk block again. Therefore, a relatively simple implementation of setting the physical disk block to be available is deleting the number that is of the target physical disk block and that is recorded in the index description. When the number of the physical disk block is no longer recorded in the index description, the target physical disk block is in an available state, that is, a write operation can be performed on the physical disk block.

Figure 7:
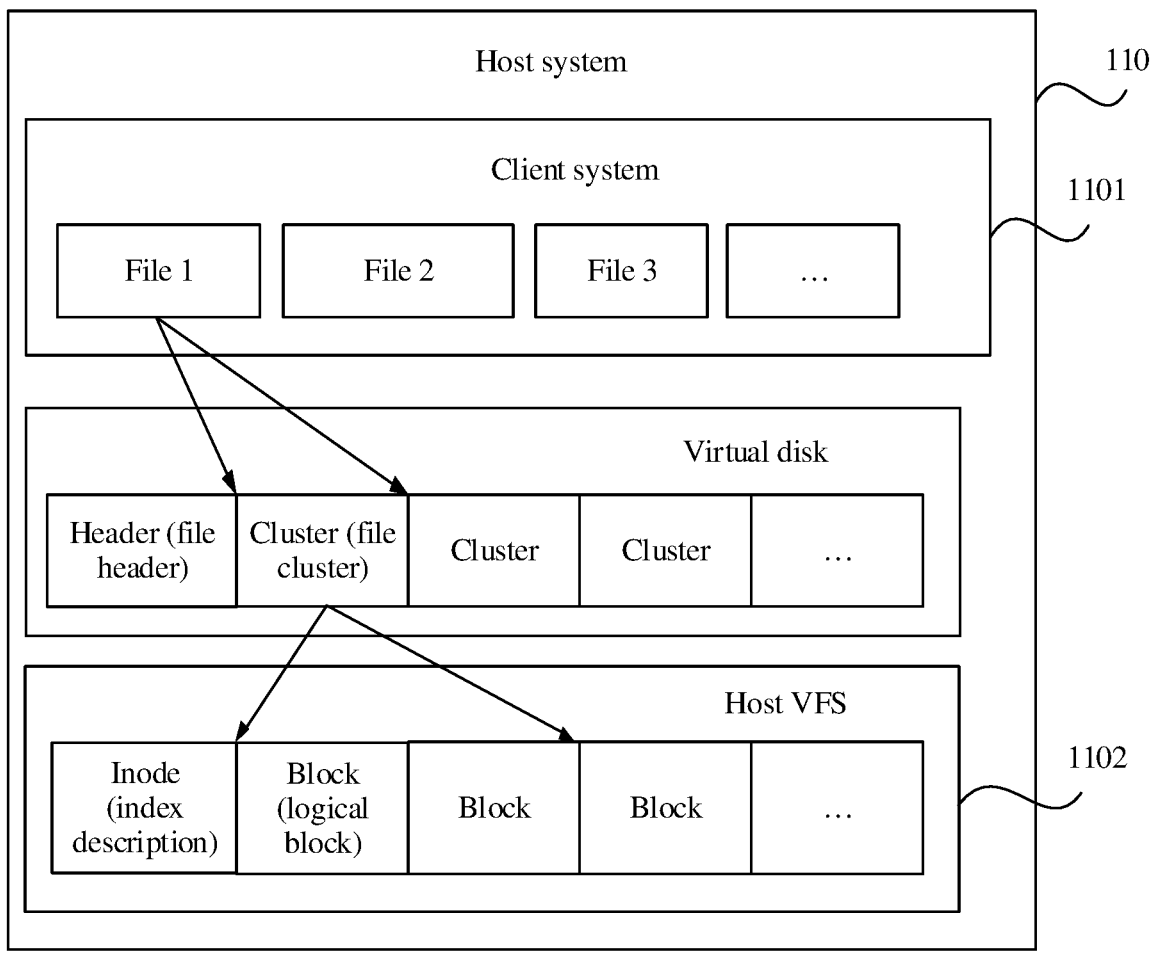
FIG. 7 is a schematic diagram of an operation process in which a client system deletes a file according to an embodiment of the present disclosure.

For example, FIG. 7 is a schematic diagram of an operation process in which a client system 1101 deletes a file according to an embodiment of the present disclosure. As shown in FIG. 7, when the client system 1101 deletes a designated file such as a file 1 in FIG. 7 (client system 1101 in FIG. 7 further includes other files such as file 2, file 3, . . . ), a client VFS in the client system 1101 generates corresponding delete information. The delete information includes information such as a file size, a file operation type, and a file operation location that are of the deleted designated file, a data storage location, and an IP address of a client corresponding to the client system 1101. A virtualization layer may access a file in a physical disk according to the information, and perform a delete operation on the corresponding file. When the client VFS generates the corresponding delete information, the client VFS triggers the virtualization layer in a host system 110 to start to work, and sends the delete information to the virtualization layer. The virtualization layer searches, according to the delete information, a virtual disk for at least one data cluster corresponding to the designated file. In FIG. 7, the corresponding data cluster is a data cluster in an area between arrows starting from the file 1 next to header (file header). The virtual disk may further include other clusters. Then, a status identifier of the at least one corresponding data cluster is set to be available. In this case, that the status identifier of the data cluster is set to be available only indicates that the status of the data cluster is changed, and does not indicate that all data in the data cluster is removed. Then, the virtualization layer determines, from a host VFS 1102 according to a storage mapping table, a target physical disk block corresponding to the at least one data cluster. As shown in FIG. 7, the corresponding target physical disk block is physical disk blocks (designated as "Block" in FIG. 7) in an area between arrows next to mode (i.e., index description). Then, the target physical disk block is set to be available, that is, a number that is of the target physical disk block and that is recorded in an index description is deleted. Therefore, the virtual disk may automatically lessen according to a delete operation of a user.

Optionally, after the physical disk block is set to be available, an operating system may recycle a waste node in the physical disk. Then, the operating system may erase, at a time, content stored in the physical disk block. After the erasure, the physical disk block can be an idle block, and new storage content can be stored in the idle block. Therefore, available physical disk space correspondingly expands.

It should be noted that, after a virtual disk is allocated to a virtual machine, the virtual disk may be changed. However, the change is not a change generated when the virtual machine is operated, and the change may be considered as an abnormal change caused by such manual copying or replacement. If the virtual disk is abnormally changed, a physical disk block corresponding to a data cluster in the virtual disk also changes. Therefore, corresponding data in the virtual disk changes. In this case, if an operation is performed based on a correspondence recorded in the storage mapping table before the change, a misoperation easily occurs. Therefore, when a host is powered off, the virtualization layer may check whether the virtual disk corresponding to the virtual machine in the host system 110 is abnormally changed, that is, determine whether a correspondence between a data cluster in the virtual disk and a physical disk block is available. If the virtual disk is not abnormally changed, it is determined that the correspondence that is between a data cluster in the virtual disk and a physical disk block and that is recorded in the storage mapping table is available. If the virtual disk is abnormally changed, it is determined that the correspondence that is between a data cluster in the virtual disk and a physical disk block and that is recorded in the storage mapping table is unavailable.

For example, it is assumed that, when a virtual machine is generated on the host, an index number in an index description established by the host VFS 1102 for a virtual disk A corresponding to the virtual machine is an inode 1. In addition, the index number is separately recorded by the virtualization layer in the host system and an area that is set in the virtual disk A and that is used to store an index number of the virtual disk. When the virtual disk A is manually replaced with a virtual disk A1, for example, the virtual disk A1 is a copy of the virtual disk A, the host VFS 1102 establishes a new index description for the virtual disk A1, and an index number in the index description is an inode 2. However, because the virtual disk A is replaced with the virtual disk A1 due to a manual operation without virtualization layer participation, an index number recorded in an area that is set in the virtual disk A1 and that is used to store the index number of the virtual disk is still the inode 1.

Optionally, a feasible implementation of checking, by the virtualization layer, whether the virtual disk corresponding to the virtual machine is changed is as follows. The index number obtained from the area that is set in the virtual disk and that is used to store the index number of the virtual disk is compared with the index number recorded in the index description. If the two index numbers are different, it indicates that the virtual disk is abnormally changed, and it is determined that the correspondence that is between a data cluster in the virtual disk and a physical disk block and that is recorded in the storage mapping table is unavailable. In this case, the correspondence needs to be processed, for example, to be deleted or modified. If the two index numbers are the same, it indicates that the virtual disk is not abnormally changed, and it is determined that the correspondence that is between a data cluster in the virtual disk and a physical disk block and that is recorded in the storage mapping table is available. In this case, the correspondence may be normally used for effective searching.

Optionally, the virtual disk processing method provided in this embodiment of the present disclosure may be applied to a virtualization scenario, a cloud computing scenario, and the like. In the virtualization scenario and the cloud computing scenario, corresponding physical disks have limited space, and virtual disks used in the virtualization scenario and the cloud computing scenario have relatively large capacities. Therefore, the virtual disk processing method provided in this embodiment of the present disclosure may be applied to the virtualization scenario and the cloud computing scenario. The virtual disk processing method provided in this embodiment of the present disclosure is applied to the virtualization scenario and the cloud scenario environment. Therefore, after the file 1 is deleted from a virtual machine in the client system 1101 to release virtual disk space in the virtual machine, a file stored in a physical disk on a host corresponding to a virtual disk may be deleted using the virtual disk processing method provided in this embodiment of the present disclosure in order to release space occupied by the file in the physical disk. In this way, disk resources can be effectively used in the virtualization scenario, the cloud computing scenario, and the like in order to improve utilization of virtualization and cloud computing resources. In addition, when systems corresponding to the virtualization environment and the cloud computing environment have specific storage space capacities, and the storage space capacities are not expanded, as many virtual machines as possible can run in the systems at the same time. In this way, the capacities of the systems are correspondingly expanded. Therefore, the virtual machines are deployed and used in a relatively flexible and convenient manner.

It should be noted that a sequence of steps of the virtual disk processing method provided in this embodiment of the present disclosure may be properly adjusted, and the steps may also be correspondingly increased or decreased according to a situation. Any variation method readily figured out by a person skilled in the art within the technical scope disclosed in this application shall fall within the protection scope of this application. Therefore, details are not described herein.

In conclusion, according to the virtual disk processing method provided in this embodiment of the present disclosure, a correspondence between at least one data cluster and at least one physical disk block is established, and both a data cluster corresponding to a designated file deleted by the client system 1101 and a corresponding physical disk block are set to be available. Therefore, a virtual disk may automatically lessen according to a delete operation of the client system 1101. Compared with a conventional virtual disk lessening method, according to the method, a virtual machine does not need to be stopped in a process in which the virtual disk automatically lessens. Therefore, a service of the virtual machine is not interrupted, and data transmission and use on the virtual machine are not affected, effectively improving work efficiency of the virtual machine.

It should be noted that, when the virtual disk is migrated, a corresponding tool may be considered to be used to generate the correspondences in this embodiment of the present disclosure, for example, the correspondence between the at least one data cluster and the at least one physical disk block.

Figure 8:
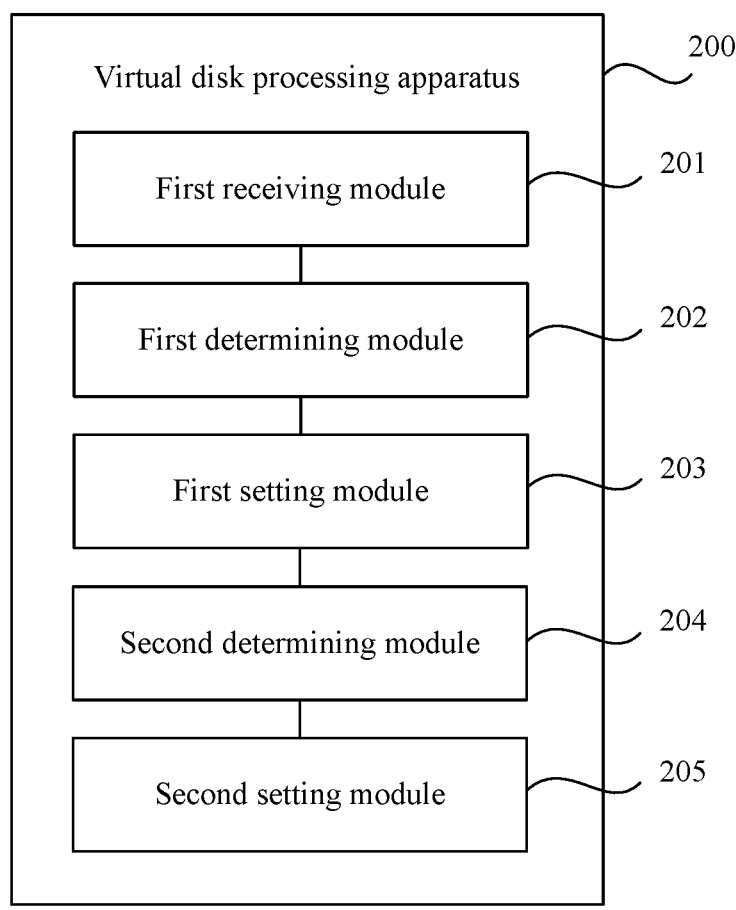
FIG. 8 is a schematic structural diagram of a virtual disk processing apparatus according to an embodiment of the present disclosure.

FIG. 8 is a schematic structural diagram of a virtual disk processing apparatus 200 according to an embodiment of the present disclosure. The virtual disk processing apparatus 200 is applied to a virtualization layer of a host that supports virtualization. As shown in FIG. 8, the virtual disk processing apparatus 200 may include a first receiving module 201 configured to receive delete information sent by a client system of a first virtual machine, where the delete information is generated by the client system after a designated file is deleted from the first virtual machine, and the delete information includes an offset corresponding to the designated file and a size of the designated file, a first determining module 202 configured to determine, according to the delete information, at least one data cluster in a first virtual disk corresponding to the designated file, where the first virtual disk is a virtual disk corresponding to the first virtual machine, a first setting module 203 configured to set the at least one data cluster to be available, a second determining module 204 configured to determine, according to a storage mapping table, a target physical disk block corresponding to the at least one data cluster, where a correspondence between a data cluster in the first virtual disk and a physical disk block is recorded in the storage mapping table, and a second setting module 205 configured to set the target physical disk block to be available.

Figure 9:
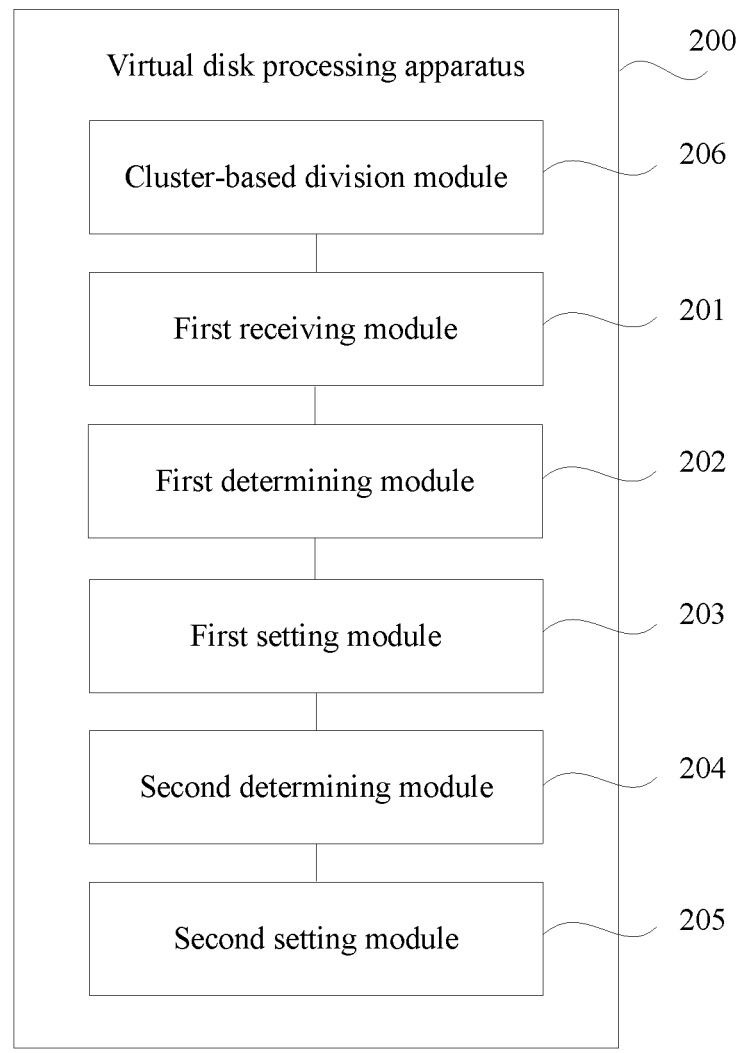
FIG. 9 is a schematic structural diagram of another virtual disk processing apparatus according to an embodiment of the present disclosure.

Optionally, as shown in FIG. 9, the virtual disk processing apparatus 200 may further include a cluster-based division module 206 configured to divide each virtual disk on the host into clusters such that each virtual disk is divided into at least one data cluster, and allocate a data cluster identifier to each data cluster.

Figure 10:
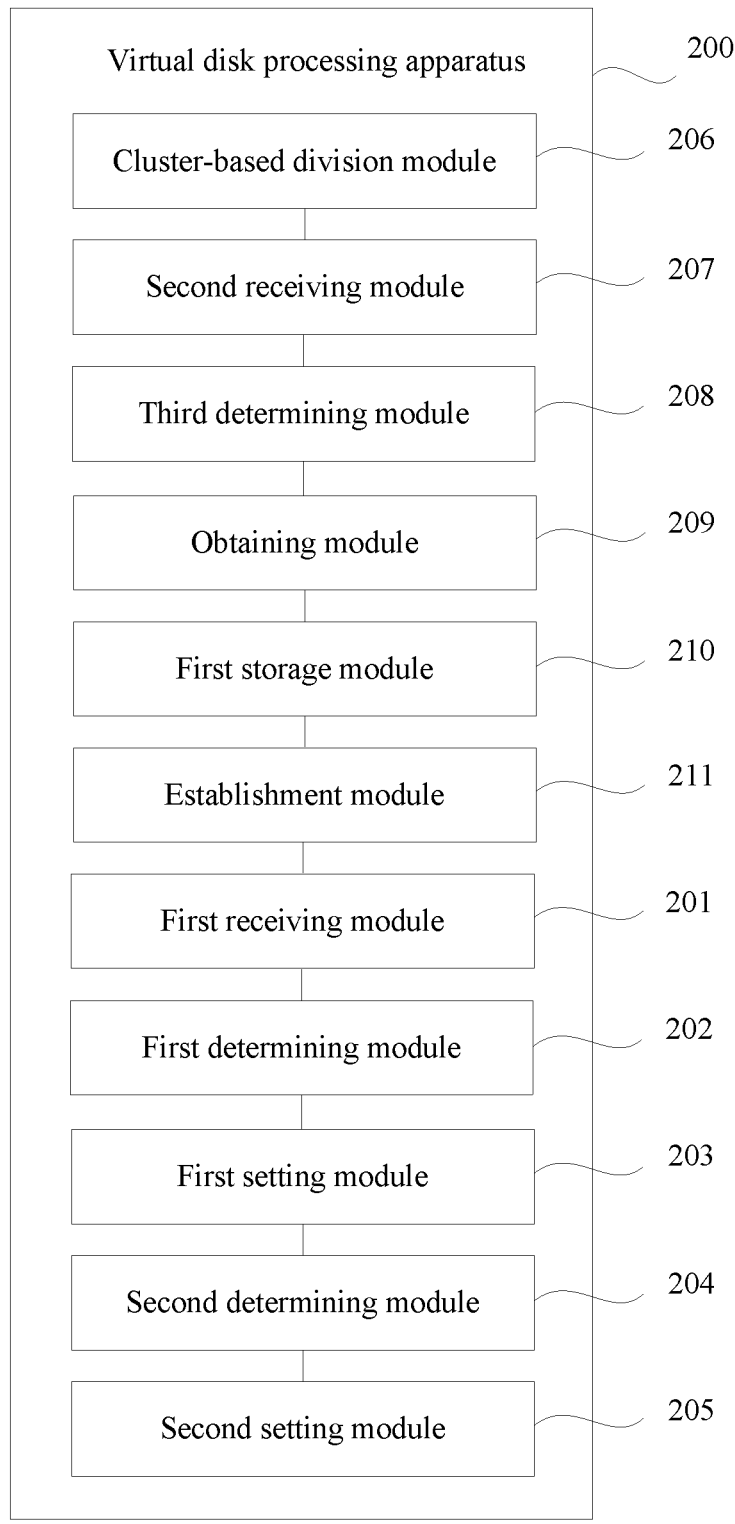
FIG. 10 is a schematic structural diagram of another virtual disk processing apparatus according to an embodiment of the present disclosure.

A physical disk on the host is pre-divided into at least one physical disk block, and each physical disk block corresponds to a number. Optionally, as shown in FIG. 10, the virtual disk processing apparatus 200 may further include a second receiving module 207 configured to receive write information sent by the client system, where the write information is generated by the client system after the designated file is written into the first virtual machine, and the write information includes the offset corresponding to the designated file and the size of the designated file, a third determining module 208 configured to determine, according to the write information, the at least one data cluster in the first virtual disk corresponding to the designated file, an obtaining module 209 configured to obtain a number of at least one physical disk block that is allocated to the first virtual disk and that is used to store the designated file, a first storage module 210 configured to store the designated file in the at least one physical disk block, and an establishment module 211 configured to establish a correspondence between the at least one data cluster and the at least one physical disk block, and record the correspondence in the storage mapping table.

In an implementation of recording the correspondence in the storage mapping table, the storage mapping table is stored in a designated physical disk block corresponding to the first virtual disk, and the correspondence between a data cluster in the first virtual disk and a physical disk block is recorded in the storage mapping table.

In this case, the second determining module 204 is further configured to obtain the storage mapping table from the designated physical disk block corresponding to the first virtual disk, and search the storage mapping table to determine the target physical disk block corresponding to the at least one data cluster.

In another implementation of recording the correspondence in the storage mapping table, the storage mapping table may be stored at a preset storage location in the physical disk, and a correspondence between a data cluster in each virtual disk on the host and a physical disk block is recorded in the storage mapping table.

In this case, the second determining module 204 is further configured to obtain the storage mapping table from the preset storage location, and search the storage mapping table to determine the target physical disk block corresponding to the at least one data cluster.

Optionally, an index description is established for each virtual disk on the host, and the index description of each virtual disk is used to record an index number for uniquely identifying the virtual disk and a number of a physical disk block occupied by the virtual disk.

Figure 11:
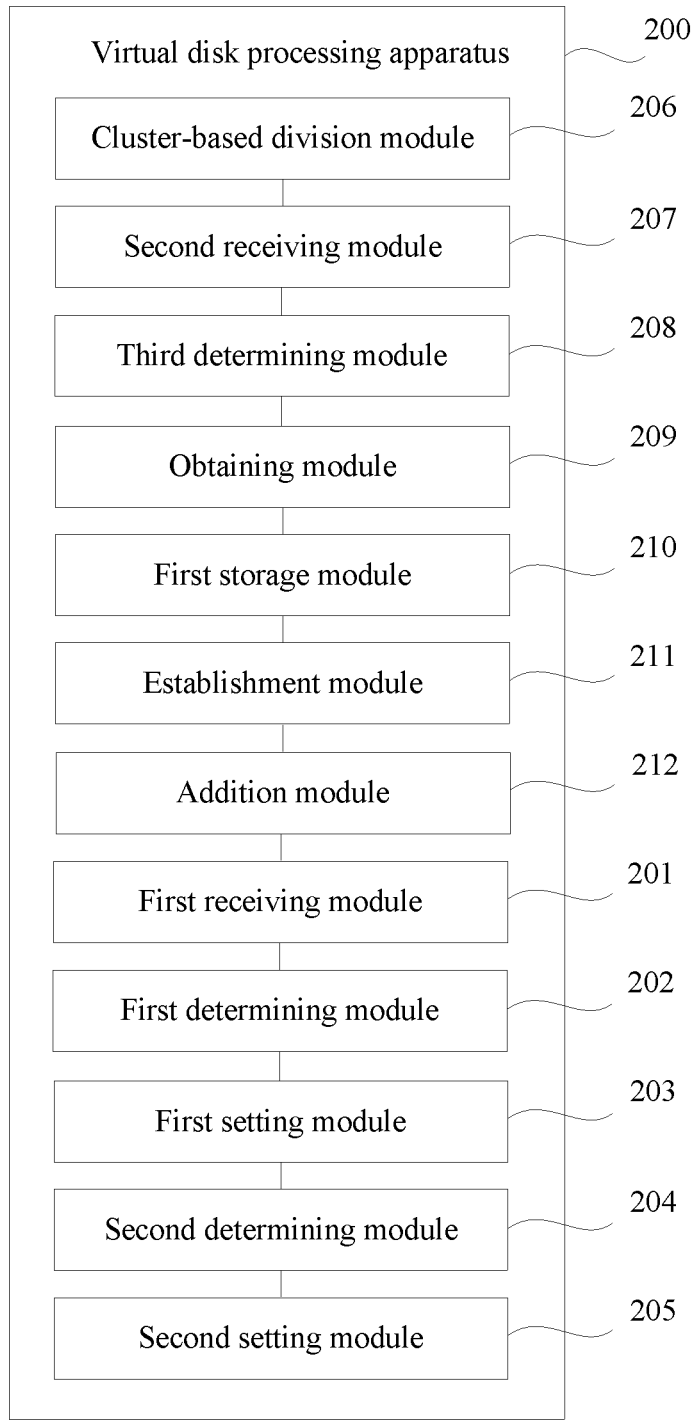
FIG. 11 is a schematic structural diagram of another virtual disk processing apparatus according to an embodiment of the present disclosure.

Optionally, as shown in FIG. 11, the virtual disk processing apparatus 200 further includes an addition module 212 configured to add the number of the at least one physical disk block to an index description of the first virtual disk.

The second setting module 205 is further configured to obtain the index description of the first virtual disk, and delete a number that is of the target physical disk block and that is recorded in the index description.

A person skilled in the art may clearly understand that for ease of description and brevity, for detailed working processes of the apparatus modules described above, refer to the corresponding processes in the foregoing method embodiment. Details are not described herein again.

In conclusion, according to the virtual disk processing apparatus 200 provided in this embodiment of the present disclosure, the establishment module 211 establishes a correspondence between at least one data cluster and at least one physical disk block, the first setting module 203 sets, to be available, a data cluster corresponding to a designated file deleted by a client system, and the second setting module 205 sets a corresponding physical disk block to be available. Therefore, a virtual disk may automatically lessen according to a delete operation of the client system. Compared with a conventional virtual disk lessening apparatus, according to the virtual disk processing apparatus 200, a virtual machine does not need to be stopped in a process in which the virtual disk automatically lessens. Therefore, a service of the virtual machine is not interrupted, and data transmission and use on the virtual machine are not affected, effectively improving work efficiency of the virtual machine.

Figure 12:
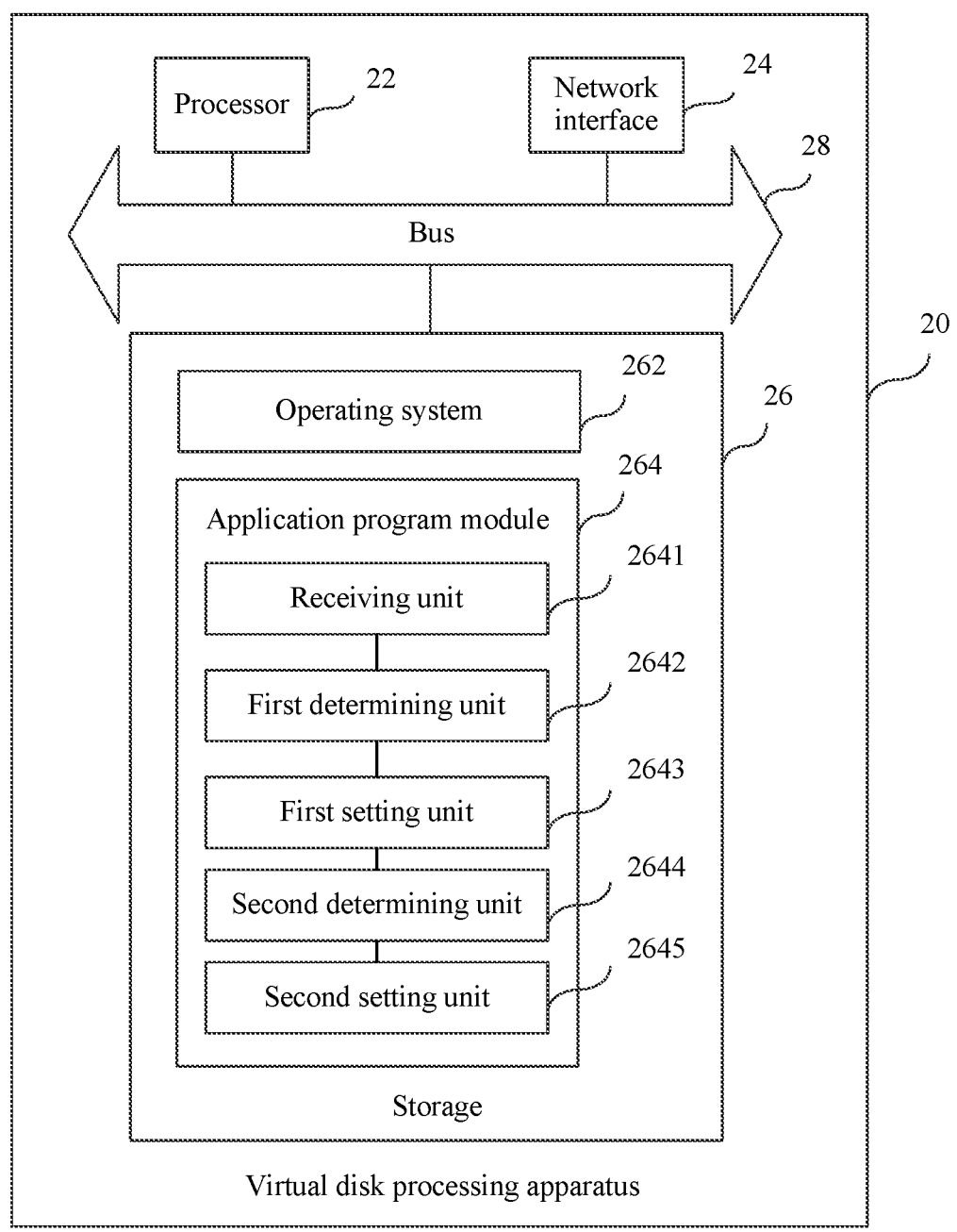
FIG. 12 is a schematic structural diagram of another virtual disk processing apparatus according to an embodiment of the present disclosure.

Referring to FIG. 12, FIG. 12 is a schematic structural diagram of a virtual disk processing apparatus 20 used in an example of an embodiment of this application. The virtual disk processing apparatus 20 may be a host, or may be a part of a host. When the virtual disk processing apparatus 20 is a host, for a structure of the virtual disk processing apparatus 20, refer to FIG. 1. For example, the virtual disk processing apparatus 20 may include a processor 22 and a network interface 24.

The processor 22 includes one or more processing cores. By running a software program and a module, the processor 22 implements various function applications and processes data.

There may be multiple network interfaces 24, and the network interface 24 is configured to communicate with another storage device or network device.

Optionally, the virtual disk processing apparatus 20 further includes components such as a storage 26 and a bus 28. The storage 26 and the network interface 24 are separately connected to the processor 22 using the bus 28.

The storage 26 may be configured to store the software program and the module. Further, the storage 26 may store an operating system 262 and an application program module 264 required for at least one function. The operating system 262 may be an operating system such as a real-time operating system (such as RTX), LINUX, UNIX, WINDOWS, or OS X.

The application program module 264 may include a receiving unit 2641, which has a function the same as or similar to that of a first receiving module 201, a first determining unit 2642, which has a function the same as or similar to that of a first determining module 202, a first setting unit 2643, which has a function the same as or similar to that of a first setting module 203, a second determining unit 2644, which has a function the same as or similar to that of a second determining module 204, and a second setting unit 2645, which has a function the same as or similar to that of a second setting module 205.

A person of ordinary skill in the art may understand that all or some of the steps of the embodiments may be implemented by hardware or a program instructing related hardware. The program may be stored in a computer-readable storage medium. The storage medium may include a read-only memory (ROM), a magnetic disk, an optical disc, or the like.

What is claimed is:

1. A virtual disk processing method, applied to a host supporting virtualization, wherein a first virtual machine runs on the host, and wherein the virtual disk processing method comprises:

receiving delete information from a client system of the first virtual machine, wherein the delete information is generated by the client system after a designated file is deleted from the first virtual machine, and wherein the delete information comprises an offset corresponding to the designated file and a size of the designated file;

determining, according to the delete information, at least one data cluster in a first virtual disk corresponding to the designated file, wherein the first virtual disk corresponds to the first virtual machine;

setting the at least one data cluster to be available;

determining, according to a storage mapping table, a target physical disk block corresponding to the at least one data cluster, wherein a first correspondence between a data cluster in the first virtual disk and a physical disk block is recorded in the storage mapping table; and setting the target physical disk block to be available, wherein the first virtual machine continues to run and is not stopped while the steps of receiving the delete information, determining the at least one data cluster, setting the at least one data cluster to be available, determining the target physical disk block, and setting the target physical disk block to be available are performed.

2. The virtual disk processing method of claim 1, wherein before receiving the delete information, the virtual disk processing method further comprises:

dividing each virtual disk on the host into clusters such that each virtual disk is divided into at least one data cluster; and allocating a data cluster identifier to each data cluster.

3. The virtual disk processing method of claim 2, wherein a physical disk on the host is pre-divided into at least one physical disk block, wherein each physical disk block corresponds to a number, and wherein before receiving the delete information, the virtual disk processing method further comprises:

receiving write information from the client system, wherein the write information is generated by the client system after the designated file is written into the first virtual machine, and wherein the write information comprises the offset corresponding to the designated file and the size of the designated file;

determining, according to the write information, the at least one data cluster in the first virtual disk corresponding to the designated file;

obtaining a number of at least one physical disk block allocated to the first virtual disk storing the designated file;

storing the designated file in the at least one physical disk block;

establishing a second correspondence between the at least one data cluster and the at least one physical disk block; and recording the second correspondence in the storage mapping table.

4. The virtual disk processing method of claim 3, wherein the storage mapping table is stored in a designated physical disk block corresponding to the first virtual disk, wherein the first correspondence is recorded in the storage mapping table, and wherein determining the target physical disk block comprises:

obtaining the storage mapping table from the designated physical disk block corresponding to the first virtual disk; and searching the storage mapping table to determine the target physical disk block corresponding to the at least one data cluster.

5. The virtual disk processing method of claim 4, wherein an index description is established for each virtual disk on the host, wherein the index description of each virtual disk records an index number for uniquely identifying a corresponding virtual disk and a number of a physical disk block occupied by the corresponding virtual disk, and wherein after storing the designated file in the at least one physical disk block, the virtual disk processing method further comprises adding the number of the at least one physical disk block to an index description of the first virtual disk, and wherein setting the target physical disk block to be available comprises:

obtaining the index description of the first virtual disk; and deleting a number of the target physical disk block recorded in the index description of the first virtual disk.

6. The virtual disk processing method of claim 3, wherein the storage mapping table is stored at a preset storage location in the physical disk, wherein a correspondence between a data cluster in each virtual disk on the host and a physical disk block is recorded in the storage mapping table, and wherein determining the target physical disk block comprises:

obtaining the storage mapping table from the preset storage location; and searching the storage mapping table to determine the target physical disk block corresponding to the at least one data cluster.

7. The virtual disk processing method of claim 6, wherein an index description is established for each virtual disk on the host, wherein the index description of each virtual disk records an index number for uniquely identifying a corresponding virtual disk and a number of a physical disk block occupied by the corresponding virtual disk, and wherein after storing the designated file in the at least one physical disk block, the virtual disk processing method further comprises adding the number of the at least one physical disk block to an index description of the first virtual disk, and wherein setting the target physical disk block to be available comprises:

obtaining the index description of the first virtual disk; and deleting a number of the target physical disk block recorded in the index description of the first virtual disk.

8. The virtual disk processing method of claim 3, wherein an index description is established for each virtual disk on the host, wherein the index description of each virtual disk records an index number for uniquely identifying a corresponding virtual disk and a number of a physical disk block occupied by the corresponding virtual disk, and wherein after storing the designated file in the at least one physical disk block, the virtual disk processing method further comprises adding the number of the at least one physical disk block to an index description of the first virtual disk, and wherein setting the target physical disk block to be available comprises:

obtaining the index description of the first virtual disk; and deleting a number of the target physical disk block recorded in the index description of the first virtual disk.

9. The virtual disk processing method of claim 1, wherein the storage mapping table comprises a database that stores correspondences between file numbers, data clusters included in the file numbers, and numbers of physical disk blocks included in the data clusters.

10. A virtual disk processing apparatus, applied to a host supporting virtualization, wherein a first virtual machine runs on the host, and wherein the virtual disk processing apparatus comprises:
  a memory configured to store program instructions; and
  a processor coupled to the memory, wherein the program instructions cause the processor to be configured to:
    receive delete information from a client system of the first virtual machine, wherein the delete information is generated by the client system after a designated file is deleted from the first virtual machine, and wherein the delete information comprises an offset corresponding to the designated file and a size of the designated file;
    determine, according to the delete information, at least one data cluster in a first virtual disk corresponding to the designated file, wherein the first virtual disk corresponds to the first virtual machine;
    set the at least one data cluster to be available;
    determine, according to a storage mapping table, a target physical disk block corresponding to the at least one data cluster, wherein a first correspondence between a data cluster in the first virtual disk and a physical disk block is recorded in the storage mapping table; and
    set the target physical disk block to be available,
    wherein the first virtual machine continues to run and is not stopped while the steps of receiving the delete information, determining the at least one data cluster, setting the at least one data cluster to be available, determining the target physical disk block, and setting the target physical disk block to be available are performed.

11. The virtual disk processing apparatus of claim 10, wherein before receiving the delete information, the program instructions further cause the processor to be configured to:
  divide each virtual disk on the host into clusters such that each virtual disk is divided into at least one data cluster; and
  allocate a data cluster identifier to each data cluster.

12. The virtual disk processing apparatus of claim 11, wherein a physical disk on the host is pre-divided into at least one physical disk block, wherein each physical disk block corresponds to a number, and wherein before receiving the delete information, the program instructions further cause the processor to be configured to:
  receive write information from the client system, wherein the write information is generated by the client system after the designated file is written into the first virtual machine, and wherein the write information comprises the offset corresponding to the designated file and the size of the designated file;
  determine, according to the write information, the at least one data cluster in the first virtual disk corresponding to the designated file;
  obtain a number of at least one physical disk block allocated to the first virtual disk storing the designated file;
  store the designated file in the at least one physical disk block;
  establish a second correspondence between the at least one data cluster and the at least one physical disk block; and
  record the second correspondence in the storage mapping table.

13. The virtual disk processing apparatus of claim 12, wherein the storage mapping table is stored in a designated physical disk block corresponding to the first virtual disk, wherein the first correspondence is recorded in the storage mapping table, and wherein when determining the target physical disk block, the program instructions further cause the processor to be configured to:
  obtain the storage mapping table from the designated physical disk block corresponding to the first virtual disk; and
  search the storage mapping table to determine the target physical disk block corresponding to the at least one data cluster.

14. The virtual disk processing apparatus of claim 13, wherein an index description is established for each virtual disk on the host, wherein the index description of each virtual disk records an index number for uniquely identifying a corresponding virtual disk and a number of a physical disk block occupied by the corresponding virtual disk, wherein after storing the designated file in the at least one physical disk block, the program instructions further cause the processor to be configured to add the number of the at least one physical disk block to an index description of the first virtual disk, and wherein when setting the target physical disk block to be available, the program instructions further cause the processor to be configured to:
  obtain the index description of the first virtual disk; and
  delete a number of the target physical disk block recorded in the index description of the first virtual disk.

15. The virtual disk processing apparatus of claim 12, wherein the storage mapping table is stored at a preset storage location in the physical disk, wherein a correspondence between a data cluster in each virtual disk on the host and a physical disk block is recorded in the storage mapping table, and wherein when determining the target physical disk block, the program instructions further cause the processor to be configured to:
  obtain the storage mapping table from the preset storage location; and
  search the storage mapping table to determine the target physical disk block corresponding to the at least one data cluster.

16. The virtual disk processing apparatus of claim 15, wherein an index description is established for each virtual disk on the host, wherein the index description of each virtual disk records an index number for uniquely identifying a corresponding virtual disk and a number of a physical disk block occupied by the corresponding virtual disk, wherein after storing the designated file in the at least one physical disk block, the program instructions further cause the processor to be configured to add the number of the at least one physical disk block to an index description of the first virtual disk, and wherein when setting the target physical disk block to be available, the program instructions further cause the processor to be configured to:
  obtain the index description of the first virtual disk; and
  delete a number of the target physical disk block recorded in the index description of the first virtual disk.

17. The virtual disk processing apparatus of claim 12, wherein an index description is established for each virtual disk on the host, wherein the index description of each virtual disk records an index number for uniquely identifying a corresponding virtual disk and a number of a physical disk block occupied by the corresponding virtual disk, wherein after storing the designated file in the at least one physical disk block, the program instructions further cause the processor to be configured to add the number of the at least one physical disk block to an index description of the first virtual disk, and wherein when setting the target physical disk block to be available, the program instructions further cause the processor to be configured to:
obtain the index description of the first virtual disk; and
delete a number of the target physical disk block recorded in the index description of the first virtual disk.

18. The virtual disk processing apparatus of claim 10, wherein the storage mapping table comprises a database that stores correspondences between file numbers, data clusters included in the file numbers, and numbers of physical disk blocks included in the data clusters.

19. A virtual disk processing method, applied to a host supporting virtualization, wherein a first virtual machine runs on the host, and wherein the virtual disk processing method comprises:
receiving delete information from a client system of the first virtual machine, wherein the delete information is generated by the client system after a designated file is deleted from the first virtual machine, and wherein the delete information comprises an offset corresponding to the designated file and a size of the designated file;
determining, according to the delete information, at least one data cluster in a first virtual disk corresponding to the designated file, wherein the first virtual disk corresponds to the first virtual machine;
setting the at least one data cluster to be available;
determining, according to a storage mapping table, a target physical disk block corresponding to the at least one data cluster, wherein a first correspondence between a data cluster in the first virtual disk and a physical disk block is recorded in the storage mapping table; and
setting the target physical disk block to be available,
wherein the storage mapping table comprises a database that stores correspondences between file numbers, data clusters included in the file numbers, and numbers of physical disk blocks included in the data clusters.

\* \* \* \* \*